United States Patent
Kaufhold et al.

(10) Patent No.: US 7,102,816 B2
(45) Date of Patent: Sep. 5, 2006

(54) ARRANGEMENT FOR THE MANUAL ADJUSTMENT OF A FOCUS POSITION ON MICROSCOPES

(75) Inventors: Tobias Kaufhold, Jena (DE); Matthias John, Kleinpuerschuetz (DE)

(73) Assignee: Carl Zeiss Jena GmbH, Jena (DE)

( * ) Notice: Subject to any disclaimer, the term of this patent is extended or adjusted under 35 U.S.C. 154(b) by 103 days.

(21) Appl. No.: 10/433,702

(22) PCT Filed: Dec. 18, 2001

(86) PCT No.: PCT/EP01/14916

§ 371 (c)(1),
(2), (4) Date: Jun. 3, 2003

(87) PCT Pub. No.: WO02/056082

PCT Pub. Date: Jul. 18, 2002

(65) Prior Publication Data

US 2004/0042074 A1    Mar. 4, 2004

(30) Foreign Application Priority Data

Jan. 16, 2001 (DE) ................................. 101 01 623

(51) Int. Cl.
G02B 21/00 (2006.01)
G02B 21/26 (2006.01)
(52) U.S. Cl. .................. 359/383; 359/368; 359/393
(58) Field of Classification Search ........ 359/368–395, 359/694–706
See application file for complete search history.

(56) References Cited

U.S. PATENT DOCUMENTS

| | | | |
|---|---|---|---|
| 4,445,758 A | * 5/1984 | Emmel | 359/392 |
| 4,653,878 A | 3/1987 | Nakasato et al. | 359/383 |
| 4,930,882 A | * 6/1990 | Koch et al. | 359/392 |
| 5,557,456 A | 9/1996 | Garner et al. | 359/393 |
| 5,684,627 A | 11/1997 | Ganser et al. | 359/388 |
| 5,825,531 A | 10/1998 | Otomo | 359/368 |
| 6,064,519 A | * 5/2000 | Otomo et al. | 359/392 |

FOREIGN PATENT DOCUMENTS

| | | |
|---|---|---|
| DE | 36 42 798 | 7/1987 |
| DE | 87 15 891.4 | 3/1988 |
| DE | 40 28 241 | 3/1992 |
| DE | 42 13 312 | 10/1993 |

* cited by examiner

Primary Examiner—Thong Q. Nguyen
(74) Attorney, Agent, or Firm—Reed Smith LLP

(57) ABSTRACT

The invention is directed to an arrangement for manual adjustment of a focus position in microscopes with a motor-operated focusing drive. According to the invention, the arrangement has a first operator's control for giving an adjusting path length and a second operator's control for giving an adjusting speed. The two operator's controls are preferably constructed as rotating knobs. An adjusting path length for the focusing movement is given by the rotational angle at the first rotating knob, and an adjusting speed of the focusing movement is given by the rotational angle at the second rotating knob. The change in the rotational angle at the first rotating knob is proportional to the change in the adjusting path and the change in the rotational angle at the second rotating knob is proportional to the change in the adjusting speed.

5 Claims, 1 Drawing Sheet

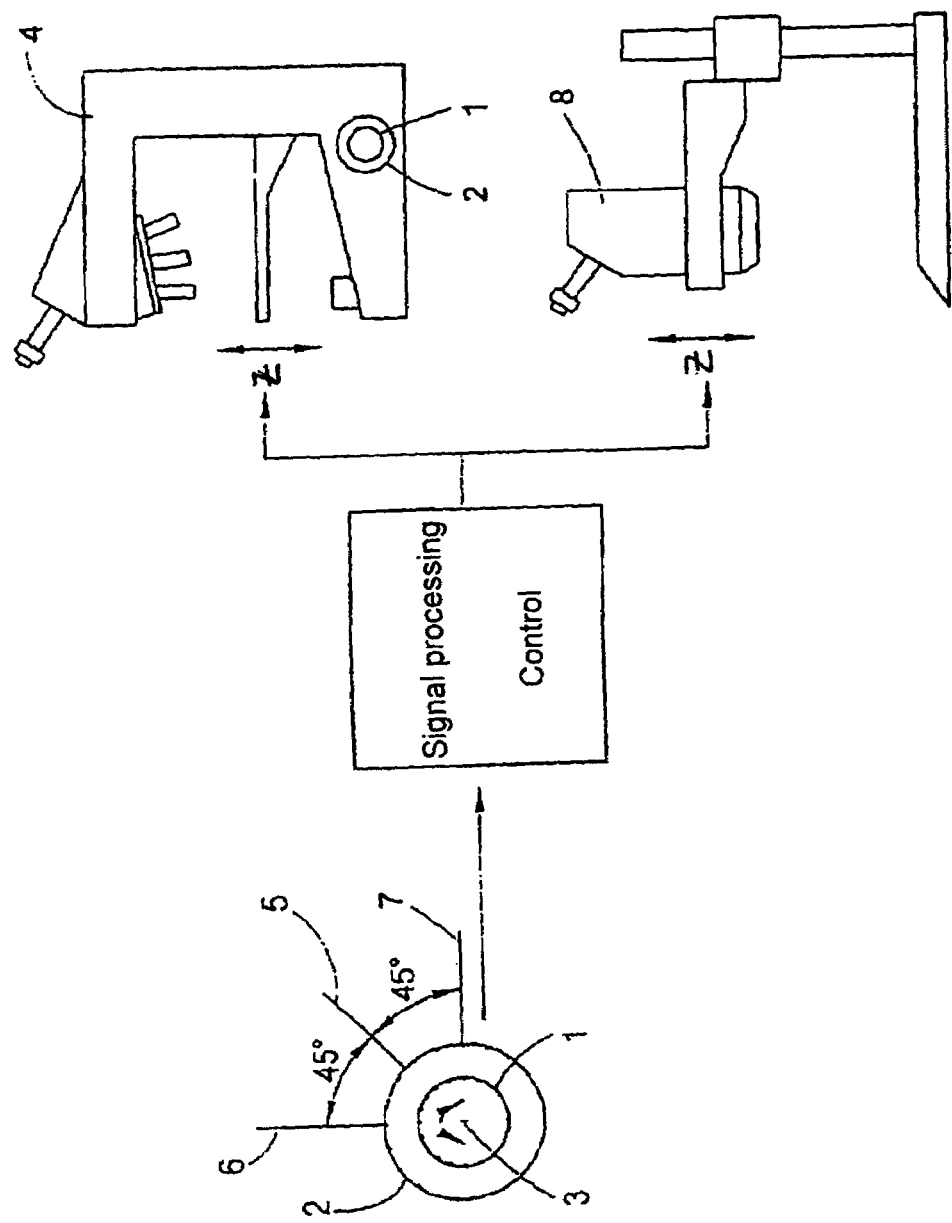

ARRANGEMENT FOR THE MANUAL ADJUSTMENT OF A FOCUS POSITION ON MICROSCOPES

CROSS-REFERENCE TO RELATED APPLICATIONS

This application claims priority of PCT Application Ser. No. PCT/EP01/14916, filed Dec. 18, 2001 and German Application No. 101 01 623.9, filed Jan. 16, 2001, the complete disclosures of which are hereby incorporated by reference.

BACKGROUND OF THE INVENTION a) Field of the Invention

The invention is directed to an arrangement for the manual adjustment of a focus position in microscopes with a motor-operated focusing drive.

b) Description of the Related Art

An essential prerequisite for observation through a microscope is the adjustment for the sharpness of the specimen section to be observed. In the classic microscope design, the focusing movement required for adjusting the sharpness of a specimen section to be observed is realized by means of gear units which have high gear ratios and a high sensitivity of adjustment.

The focusing movement can be initiated manually, for example, by turning a drive knob which transmits the rotational movement via a spindle-nut adjusting device to the stage or to the microscope housing and accordingly causes a relative movement between the microscope body and specimen.

However, in other common focusing arrangements the positioning of the specimen relative to the microscope body is realized by a stepping motor which is controlled in a definite manner. Both the adjusting speed and adjusting path are determined by the control. The invention described in the following also belongs to this technical field. The speed of the focusing movement and of the adjusting path in a desired direction of the focusing movement are given by control commands by means of operator's controls which are actuated manually.

OBJECT AND SUMMARY OF THE INVENTION

It is the primary object of the invention to provide an ergonomically favorable construction of the operator's controls and, accordingly, a sensitive triggering of the adjusting commands.

According to the invention, the arrangement for adjusting a focus position has a first operator's control for giving an adjusting direction and an adjusting path and a second operator's control for giving an adjusting speed.

Both operator's controls are preferably constructed as rotating knobs; the rotational angle at the first rotating knob determines an adjusting path length for the focusing movement and the rotational angle at the second rotating knob determines an adjusting speed of the focusing movement. The change in the rotational angle at the first rotating knob is proportional to the change in the adjusting path and the change in the rotational angle at the second rotating knob is proportional to the change in the adjusting speed. The direction of the focusing movement is given by the rotating direction of the rotating knobs.

In a particularly preferred construction, the two rotating knobs are arranged so as to be rotatable concentrically around a common axis and are arranged directly one behind the other on this axis, and the diameter of the first rotating knob is smaller than the diameter of the second rotating knob. Both rotating knobs are connected to the operation and control device of the microscope by a control circuit or by actuating members for generating actuating signals depending on the rotational angle.

This results in a substantial advantage over arrangements known in the prior art, since focusing and fine focusing are made possible easily and in a sensitive manner without a noticeable expenditure of force. Another advantage consists in that it is not necessary to change one's grip when turning the rotating knobs, e.g., in order to realize large adjusting paths.

The first rotating knob is freely rotatable in both opposing directions; the rotational angles are divided into angular increments in both rotating directions and every angular increment corresponds to one or more path increments of the adjusting path.

The second rotating knob advantageously has a zero position from which it is rotatable in both opposite rotating directions against a restoring force which increases as the rotating angle increases until reaching a predetermined end position. In the zero position, the adjusting speed has the value of zero and an increasing rotational angle in one rotating direction or the other corresponds to an increasing adjusting speed. In the respective end position, the adjusting speed reaches its maximum.

It is preferably provided that the rotational angles of the second rotating knob are limited to a maximum of 45° by the end positions in both opposite rotating directions.

Because of the increasing opposing force during the rotation of the second rotating knob to one of the end positions, this second rotating knob returns to the zero position as soon as it is released, and the focusing movement comes to a stop.

This results in a very user-friendly handling and it is possible to carry out a rough adjustment by setting the adjusting speed as well as a fine adjustment by setting an adjusting path length in a very sensitive manner with the fingers of one hand, while observing through the eyepiece the sharpness of a specimen section which changes with the adjustment.

The arrangement according to the invention can also be used in an advantageous manner at the motor-actuated support of a stereo microscope, wherein the specimen stage is arranged in a stationary manner as a rule, while the entire stereo microscope body 8 is to be raised and lowered for focusing purposes, which can be realized in a sensitive manner and without expenditure of force in the manner described herein.

The invention will be explained more fully in the following with reference to an embodiment example.

BRIEF DESCRIPTION OF THE DRAWING

A drawing showing the basic construction of the arrangement according to the invention is provided.

DESCRIPTION OF THE PREFERRED EMBODIMENTS

In the construction shown herein, a first operator's control in the form of a rotating knob 2 is provided for rough focusing. A second operator's control in the form of another rotating knob 1 is used for fine focusing.

In the present context, the focusing movement is always understood as adjustment in the direction of coordinate Z or the advancing movement for sharpness adjustment of the microscope toward a selected specimen section, for example, within the depth of a specimen.

According to the invention, it is further provided that the two rotating knobs 1 and 2 are mounted so as to be rotatable concentrically around a common axis 3 and are arranged directly one behind the other on this axis. Accordingly, for example, rotating knob 2 is located between rotating knob 1 and the outer surface of the housing of a microscope body as is shown at the right-hand side of the drawing with reference to the schematic view of a transmitted-light microscope 4. The diameter of the first rotating knob 1 is smaller than the diameter of the second rotating knob 2.

Another peculiarity of the arrangement according to the invention consists in that the second rotating knob 2 has a zero position 5 proceeding from which it can be rotated, e.g., by 45° in both opposite rotating directions. The rotation in both directions is limited by end positions in the form of stops 6 and 7. Further, it is provided that a restoring force increases as the rotational angle increases relative to the respective stop 6 or 7, which restoring force can be achieved, for example, by arranging return springs between a driver at the rotating knob 2 and a stationary device part.

In this way, the rotating knob 2 always resumes its zero position 5 when released. In this connection, it is further provided that the adjusting speed has the value of zero when the rotating knob 2 is located in the zero position 5, as a result of which the focusing movement comes to a stop as soon as the rotating knob 2 is released.

The first rotating knob 1, whose diameter is less than rotating knob 2, is freely rotatable in both opposite directions, that is, no limitations of the end positions are provided in this case and there is also no restoring force which increases as rotation increases.

As the rotating knob 1 rotates in one rotating direction or the other, an associated adjusting direction and adjusting path are given for the movement of the object stage relative to the microscope body.

In this connection, the rotating knob 1 is outfitted with an incremental angle transmitter and every angular increment triggers the adjustment over one or more angular increments in one movement direction or the other depending on the rotating direction by means of appropriate control.

As an alternative to the arrangement of the two rotating knobs 1 and 2 at the microscope housing, as is shown in the example of the transmitted-light microscope 4 on the right-hand side of the drawing, the rotating knobs 1 and 2 can also be provided at a freely movable manual operation device which is connected to the microscope body in this case by a control and supply line.

The arrangement according to the invention makes possible a very sensitive and simple handling in initiating the focusing movement by deliberate control of the motor-actuated drive in that fine focusing is carried out by turning rotating knob 1 and rough focusing is carried out by turning rotating knob 2, in both cases with the fingers of the same hand.

While the foregoing description and drawings represent the present invention, it will be obvious to those skilled in the art that various changes may be made therein without departing from the true spirit and scope of the present invention.

| Reference Numbers: | |
|---|---|
| 1, 2 | rotating knob |
| 3 | axis |
| 4 | transmitted-light microscope |
| 5 | zero position |
| 6, 7 | stop |
| Z | coordinate |

The invention claimed is:

1. An arrangement for the manual adjustment of a focus position in a microscope with a motor-operated focusing drive, comprising:
    a first operator's control for giving an adjusting path length in a focusing movement; and
    a second operator's control for giving an adjusting speed in the focusing movement,
    wherein the focusing movement can be initiated, as selected, either with the first operator's control or with the second operator's control,
    wherein the first and second operator's controls are constructed as rotating knobs, wherein the adjusting direction of the focusing movement is given by the rotating direction of the two rotating knobs, an adjusting path length for the focusing movement is given by a rotational angle of the first rotating knob, and an adjusting speed of the focusing movement is given by the a rotational angle of the second rotating knob, and wherein the change in the rotational angle of the first rotating knob is proportional to the change in the adjusting path and the change in the rotational angle at the second rotating knob is proportional to the change in the adjusting speed and,
    the second rotating knob has a zero position from which it is rotatable in both opposite rotating directions against a restoring force which increases as the rotating angle increases until reaching a predetermined end position, wherein the adjusting speed has the value of zero in the zero position and the adjusting speed has its maximum in each of the end positions.

2. The arrangement according to claim 1, wherein the two rotating knobs are arranged so as to be rotatable concentrically around a common axis and are arranged directly one behind the other on this axis, wherein the diameter of the first rotating knob is smaller than the diameter of the second rotating knob.

3. The arrangement according to claim 2, wherein the first rotating knob is freely rotatable in both opposite rotating directions, the rotational angles are divided into angular increments in both rotating directions, and every angular increment corresponds to one or more path increments of the adjusting path.

4. The arrangement according to claim 1, wherein the rotational angles of the second rotating knob are limited to a maximum of 45° in both opposite rotating directions.

5. The arrangement according to claim 1, wherein the operator's controls are connected to a control device of the microscope by actuating members for generating actuating signals depending on the rotational angle of the first and second rotating knobs.

* * * * *